United States Patent Office 3,342,786
Patented Sept. 19, 1967

3,342,786
NOVEL NITROGENOUS POLYMERS
William D. Emmons, Huntingdon Valley, Pa., assignor to Rohm & Haas Company, Philadelphia, Pa., a corporation of Delaware
No Drawing. Continuation of application Ser. No. 368,737, May 19, 1964. This application Aug. 5, 1966, Ser. No. 570,417
10 Claims. (Cl. 260—78.4)

This application is a division of my copending application Ser. No. 368,737, filed May 19, 1964.

This invention relates to addition polymers of novel esters of unsaturated carboxylic acids selected from the group consisting of those having the Formulas I and IA following:

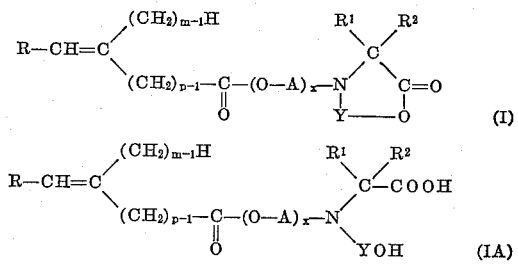

wherein

R is selected from the group consisting of H and methyl,
$m$ is an integer having a value of 1 to 3, preferably 1–2,
$p$ is an integer having a value of 1 to 4,
$x$ is an integer having a value of 1 to 4, preferably 1–2,
A is an alkylene group having 2 to 4 carbon atoms,
$R^1$ and $R^2$ are selected from the group consisting of (1) a composite group which forms a cyclic ($C_5$ to $C_7$)-hydrocarbon group with the adjoined C atom and (2) separate groups in which $R^1$ is selected from the group consisting of H, ($C_1$–$C_8$)-alkyl, and phenyl, and $R^2$ is selected from the group consisting of H and ($C_1$–$C_8$)-alkyl,
Y is an alkylene group having 2 to 4 carbon atoms, A having at least two carbon atoms extending in a chain between the adjoined O and N atoms and Y having 2 carbon atoms extending in a chain between the adjoined O and N atoms, with the provisos that when $p$ is greater than 1, $m$ is 1 and when $m$ is greater than 1, R is H.

Preferred compounds are those in which $p$ is 1, R, and $R^1$, and $R^2$ are H, and A and Y are selected from the group consisting of —$CH_2CH_2$—, —$CH(CH_3)CH_2$— and —$CH_2CH(CH_3)$—

The compounds of Formula I may be prepared by any of the processes described in application Ser. No. 368,737 supra, such as by the transesterification of an ester of the formula

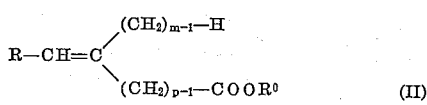

wherein $m$, $p$, and R are as defined hereinabove, and $R^0$ is any hydrocarbon radical of an alcohol, preferably a saturated lower aliphatic alcohol, such as methanol, ethanol, isopropanol, or butanol, with an N-substituted-morpholinone-2 of the formula

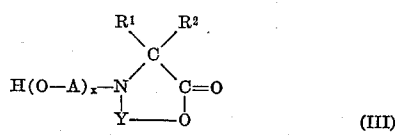

wherein A, $x$, $R^1$ and $R^2$ and Y are as previously defined.

The esters, and preferably the methyl or ethyl esters, of the following unsaturated acids are representative of those that may be used in the transesterification process:

| | |
|---|---|
| acrylic | 3-pentenoic |
| methacrylic | 5-hexanoic |
| crotonic | 2-methyl-4-pentenoic |
| 4-pentenoic | 3-methyl-4-pentenoic |

The monomers of Formula I hereinabove are generally colorless liquids which are reasonably stable at room temperature although if they are to be stored over long periods of time, it is advisable to maintain them under refrigeration. Some of the monomers of Formula I are water-soluble and those of higher molecular weight are insoluble in water. All of the monomers of Formula I are characterized by two points of reactivity, one being the double bond in the acyl portion of the molecule by virtue of which the compounds are adapted to polymerize by the typical vinyl addition process to form linear polymers and copolymers. The cyclic radical of the monomers of Formula I or of polymers thereof is hydrolyzable in aqueous media to form an N-hydroxyalkyl glycine type of radical of the formula

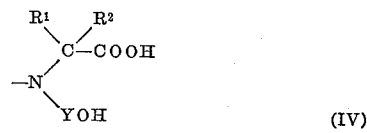

The monomer of Formula I hydrolyzes to a substantial extent in aqueous media to produce a corresponding monomer having the following Formula IA

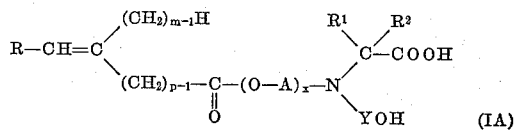

This hydrolysis is an equilibrium reaction and normally proceeds to an extent of about 95 to 99% or better. During polymerization in aqueous media, the extent of this hydrolysis varies with the conditions of temperature and whether the medium is neutral, acid or alkaline. Generally, however, at least 50% and often as much as 75% by weight or more of the monomer is thus hydrolyzed during polymerization so that the polymer may contain 50 to 75% or more of the monomer in the hydrolyzed N-hydroxyalkyl glycine form and up to 25 or 50% thereof in unhydrolyzed form. Under certain polymerization conditions, for example, in strongly basic aqueous media or in aqueous media at elevated temperatures of 80 to 90° C., a part of the monomer may even hydrolyze at the acyclic ester linkage of

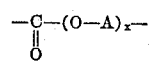

to form an acid, such as acrylic acid when R is H and $m$ and $p$ are both 1. Normally, this hydrolysis may be avoided or limited to a very small extent, say of ½ to 2%, by avoiding the highly alkaline or high temperature conditions required to effect it in aqueous media. Thus, in the polymers produced from a monomer of Formula I in aqueous polymerization systems, emulsion, suspension, or precipitation, the polymers resulting from the polymerization are generally either homopolymers of a compound of Formula IA or more commonly copolymers thereof containing also units resulting from polymerization of an unhydrolyzed monomer of Formula I, in some cases with a small amount of an acid of the formula

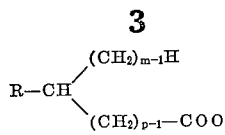

with or without other monomers included in the monomer mixture for copolymerization.

Polymers of a compound of Formula I may, after their preparation, be hydrolyzed to the N-hydroxyalkyl glycine form by subjecting them to an aqueous medium at room temperature but this reaction is slow. The hydrolysis may be accelerated by heating the aqueous medium, such as to 40 to 100° C., and/or by including therein an acidic or alkaline material even in small amounts, such as from about 0.1 to 2% by weight of the medium.

All of the monomers of Formula I as well as those of Formula IA may be polymerized to form homopolymers or copolymers using conventional free-radical initiators for this purpose. The polymerization may be effected in solution, emulsion, or suspension techniques depending upon the nature of the monomer and of the polymer desired. When polymerization of the water-soluble monomers of Formula I is carried out in aqueous solution, the heterocyclic ring is hydrolyzed in the manner mentioned hereinabove to form corresponding monomers of Formula IA and to introduce in the polymer N-hydroxyalkyl glycine type radicals of Formula IV. Any of the monomers of Formula I, whether water-soluble or of water-insoluble type, may be polymerized in solutions in organic solvents such acetonitrile, dimethylformamide, or the like in the absence of water so that polymer products are obtained which retain the heterocyclic group without modification.

The water-soluble homopolymers and copolymers containing the N-hydroxyalkyl glycine type radical may be used for many purposes, such as cation-sequestering agents, especially for polyvalent metal ions like iron, copper, calcium, magnesium, and generally as sizes and adhesives. The water-soluble polymers may be used for incorporation in pigment-printing and dyeing compositions based on emulsion polymers used in the textile industry and in similar aqueous emulsion polymer systems intended for the mineral coating of paper, as well as in aqueous polymer systems used for base coating and finish coating of leather. In these systems, the presence of the N-hydroxyalkyl glycine type radical apparently serves (1) to sequester polyvalent metal ions which often tend to coagulate the emulsion polymer systems and (2) to favor adhesion of the composition to the substrate.

Preferred polymers of the present invention may be obtained by the copolymerization of monomer mixtures containing from about ½% to 30%, or an optimum proportion of about 3 to 10% by weight, of at least one monomer selected from the group consisting of those of Formula I and of Formula IA, the balance of the mixture comprising at least one other ethylenically unsaturated copolymerizable monomer having a terminal

group. When starting with monomers of Formula I, the copolymers may generally be made in organic solvent media if it is desired that they retain essentially all of the heterocyclic groups of Formula I in the polymer molecule. The invention includes not only the water-soluble homopolymers and copolymers of a monomer of Formula IA mentioned hereinbefore, but also water-insoluble copolymers containing a minor proportion of a monomer of Formula IA with one or more other ethylenically unsaturated copolymerizable monomers having a terminal

group and preferably only one such ethylenically unsaturated group.

Examples of other monomers that may be included in the preferred copolymers are: vinyl esters of fatty acids having from 1 to 18 carbon atoms, such as vinyl acetate, vinyl laurate, and vinyl stearate; the nitriles, amides, and esters of an α,β-monoethylenically unsaturated acid, such as acrylic acid, methacrylic acid, itaconic acid, maleic acid, and fumaric acid, the esters being those of a saturated alcohol having 1 to 18 carbon atoms, examples of suitable acrylamides being acrylamide per se, methacrylamide per se, N-alkoxymethyl-acrylamide or N-alkoxymethylmethacrylamide in which the alkoxymethyl group contains from 2 to 9 carbon atoms, especially N-butoxymethyl-acrylamide or -methacrylamide, N-methylacylamide, N-butylmethacrylamide, N-octylacrylamide, N,N-diethylacrylamide, and examples of the esters of the acids including the saturated aliphatic alcohol esters of acrylic or methacrylic acid in which the alcohol has from 1 to 18 carbon atoms, such as methyl methacrylate, methyl acrylate, ethyl acrylate, n-butyl acrylate, tert-octyl acrylate or methacrylate, lauryl methacrylate, myristyl methacrylate, stearyl acrylate or methacrylate. Other monomers that may be used with the compound of Formula I or of Formula IA or with a mixture of such compounds of Formulas I or IA and any of the esters, nitriles, or amides just mentioned include monovinyl aromatic compounds such as styrene, vinyltoluene, vinyl chloride, vinylidene chloride, and also, in amounts not exceeding 10% by weight on the copolymer, an acid, such as acrylic acid, methacrylic acid or itaconic acid. Generally, the contents of such acids may preferably be kept in the lower range of from about ½ to 3% by weight of the copolymer. Small amounts up to about 0.8 weight percent based on the polymer of polyethylenically unsaturated monomers such as divinylbenzene, ethyleneglycol dimethacrylate, butyleneglycol dimethacrylate, or diallyl phthalate may be used to increase the molecular weight of the polymers without using so much of the polyethylenically unsaturated monomers as to cause gelation because of excessive crosslinking. Larger amounts of the polyethylenically unsaturated comonomer may be used if it is desired to produce highly insoluble crosslinked copolymers of a compound of Formula I or IA.

These copolymers may be used as compositions for coating and impregnating various substrates such as metals, wood, plastics, masonry of all types, paper, leather, and textiles.

The hydrolyzed monomers, that is those of Formula IA, may be, as stated, polymerized to form water-soluble polymers adapted to serve as sequestering agents, sizes, and adhesives. Copolymers thereof with any of the other ethylenically unsaturated monomers mentioned hereinabove may be quite advantageously used as coating and impregnating compositions. It has been found that the polymers of a monomer of Formula IA are apparently largely converted into polymers of Formula I when subjected to heat, as in drying, baking, or curing operations. This heat apparently causes the N-hydroxyalkyl glycine type radical of Formula IV to cyclize and thereby form a more insoluble and heat-resistant form of polymer deposit.

In aqueous polymerization systems suitable initiators include ammonium persulfate or an alkali metal persulfate, such as of potassium or sodium. These initiators may be used with reducing agents such as an alkali metal metabisulfite to provide a redox system. The initiator and/or reducing agent may be used in the amounts such as from 0.1 to 3% of initiator based on monomer, and between about 0.05 and 1.5% of the reducing agent based on monomer.

In organic solvent systems, suitable initiators include solvent-soluble peroxides such as benzoyl peroxide, lauryol peroxide and azo catalysts such as diazodiisobutyronitrile and dimethyl α,α'-azodiisobutyrate. The proportion of such initiators may be between 0.1% and 5%, preferably about 0.5% to 1.5%, based on the monomer.

Oil-soluble copolymers of a compound of Formula I or IA in which the comonomer is a long-chain alkyl acrylate or methacrylate such as a ($C_4$—$C_{18}$)-alkyl acrylate or methacrylate may be used as oil additives in some cases to provide dispersing qualities, and in others to depress the pour-point.

The solution copolymers of Formula I or of Formula IA may be used for coating and impregnating and as adhesives for all sorts of substrates including paper (e.g. for imparting wet-strength or as a binder in mineral coating), textiles (bonding non-woven fabrics, shrinkproofing wool, and creaseproofing cotton and rayon), leather, wood, and metals, either bare or printed with conventional alkyd resin, epoxy resin, or aminoplast resin primers. For this purpose, copolymers containing from about ½ to 10% of at least one monomer of Formula I may be used to form coatings or impregnations which adhere quite well to these substrates. The improved adhesion obtainable in many cases as compared to polymers containing no monomer of Formula I is not understood, but possibly might be attributable to the formation to even a slight degree of the N-hydroxyalkyl glycine type radicals of Formula IV as a result of the presence of a small amount of humidity even in using or applying the coating or impregnant while dissolved in organic solvent media.

The copolymers of the present invention may be used for prime coating of bare metal or either as a subcoating or finish coating on metal that is bare or previously primed with the mentioned primers or the compositions mentioned hereinabove.

The deposits of the polymers of monomers either of Formula I or of Formula IA or both resulting from the coating or impregnating of substrates are preferably heated to a temperature in the range of 110° to 300° C. but below the decomposition temperature of the substrate, or of the polymer involved. This generally assures the greatest insolubility, resistance to heat, and adhesion obtainable from compositions comprising the polymers of the present invention.

The organic solvent solutions of the polymers and copolymers may be mixed with other resinous materials including polyepoxides, aminoplasts, such as a butoxymethyl melamine resin, a phenoplast, alkyd resins, or other oil-soluble vinyl resins, a preferred example being a polymethylmethacrylate. A polymer of the present invention may be mixed with two or more of the abovementioned resins. For example, it may be a component of a mixture with a polyepoxide and an aminoplast or phenoplast. Again, it may be a component of a mixture with an aminoplast and an alkyd resin. It may be a component of a mixture of an oil-modified alkyd resin with a polymethyl methacrylate. A catalyst of acidic or alkaline type, depending on the particular auxiliary material, may be included in the coating or impregnating compositions to accelerate curing of the deposits formed therefrom. Heating to 110 to 300° C. for a period of a few seconds to a half hour or so is frequently preferred also, the longer time being used at the lower temperature and vice versa.

Fields of general utility have already been pointed out. Some of the more specific and preferred applications or uses to which they may be put are described in the following passages.

Water-soluble homopolymers of compounds of Formula IA may be used as sizes for paper, textiles and particularly as warp sizes. When introduced into paper pulps, they may provide increased wet strength in the final dry paper containing them. For this purpose, there may be used from about 1 to 7% of a polymer of one of the compounds of Formula IA on the dry fiber weight of the paper. These homopolymers may also be used as flocculants, especially when of higher molecular weights of at least 20,000 to 50,000 or more, to aid in the clarification of aqueous systems containing clays, or other finely divided materials, especially mineral matter as is produced in the grinding of ores, not only by increasing the settling rate but generally by increasing the rate of filtration. These homopolymers may be used in admixture with other materials, such as starch, gelatin, or plasticizers therefor to provide coatings or films, thickening materials, warp sizes or the like. The homopolymers with other film-forming materials, such as vinyl and acrylic resins, may be pigmented or dyed to provide decorative coatings on substrates, such as textile, leather, paper, wood or on metal or glass surfaces. These homopolymers are apparently reactive with, and may be combined with, aminoplast resin-forming condensation products, such as those of urea-formaldehyde or triazineformaldehyde condensates including melamine-formaldehyde. The inclusion of these homopolymers of the present invention may in some instances serve to increase the toughness of the product and the water-resistance thereof when used in amounts of about 5 to 15% based on the weight of the aminoplast condensate.

Copolymers containing a large proportion of the compound of Formula IA may be used for the same purposes just mentioned to the extent that they are water-soluble, for example as warp-sizes, binders in the mineral coating of paper, wet-strength resins in paper sequestraints, and flocculants. However, water-soluble and water-insoluble copolymers containing from about 0.5 to 20% by weight or more of one or more of the compounds of Formula IA with various comonomers are adapted to provide valuable coating and impregnating materials which may be pigmented or not, and may contain plasticizers or not, and in the case of emulsion copolymers, they are adapted to provide valuable water-base paints.

Examples of plasticizers that may be used are dibutyl phthalate, butyl benzyl phthalate, triphenyl phosphate, di-n-hexyl adipate, methyl abietate, ethyl phthalyl ethyl glycolate, tributyl phosphate, diisooctyl phthalate, and glycerol monoricinoleate. Examples of pigments include carbon black, titanium dioxide, ultramarine blue, lead chromate, copper phthalocyanine blues and greens, zinc chromate, zinc oxide, clays, calcium carbonate, lead carbonate, and barium sulfate, iron oxides, toluidines, Prussian Blue, Chrome Yellow, Para Red Toners, Lithol Red, Cadmium Red, and Chromium oxide.

Copolymers containing at least 1% and preferably from 5 to 20% by weight of a compound of Formula IA with ethyl acrylate, butyl acrylate, or the like, may be used to reduce the shrinkage of wool. For this purpose, they may be applied in aqueous dispersions of a concentration from 10 to 30% so that from about 5 to 15% by weight of the copolymer is deposited on the wool fabric. After drying, the treated fabric may be heated to 240° F. to 350° F. for a period of one-half to fifteen minutes. The copolymers just described which have apparent second order transition temperatures of about −40° C. to about 20° C. containing ½ to 5% or even up to 10 or 20% by weight of units derived from a monomer of Formula IA may also serve as excellent binders for non-woven fabrics of all types of natural and synthetic fibers or filaments made by the air-deposition, carding or garnetting of the fibers or filaments, such as those of rayon, wool, cellulose acetate and other esters and ethers, vinyl resins, polymers of acrylonitrile, poly(ethylene glycol terephthalate), glass, and other mineral fibers, and so on. For this purpose, there may be used from 5 to 150% by weight of the binder on the weight of fiber or even as high as 400% thereon. The treated fibrous material should be dried and then subjected to a bake, such as at 240° F. to 350° F. for a period of one-half to thirty minutes, to cure the polymer thereon. Similar aqueous dispersions made by the emulsion copolymerization of a monomer of Formula IA with acrylic esters and especially butyl acrylate or ethyl acrylate may be used, with or without pigment, for the primary coating of leather.

They may also be used as binders in the mineral coating of paper. Copolymers with acrylonitrile, especially those containing from 75 to 90% of acrylonitrile, with a compound of Formula I or IA may be used as fiber- and film-forming materials which are adapted to be spun or cast to form fibers and films characterized by modified receptivity toward dyes. Copolymers of a compound of Formula I or IA with acrylic acid or methacrylic acid or copolymers thereof with a vinylpyridine, when included in melts or solutions of polymers of acrylonitrile containing 75 to 90% acrylonitrile, such as copolymers thereof with vinyl chloride, vinyl acetate or the like, may also be used to modify the dyeing properties of fibers and films formed therefrom.

Solutions of either the homopolymers or copolymers of the present invention may be used in cosmetic preparations and especially in sprays for setting women's hair after waving. The copolymers may also be blended with other resins, such as the aminoplast resin-forming condensation products mentioned above, vinyl or acrylic resins, such as polystyrene, polyvinyl chloride, polymethyl methacrylate, alkyds, cellulose esters and others, to form valuable coating compositions.

Water-soluble polymers containing units of a compound of Formula IA may be used as dressings, sizes, or finishes for textiles, leather, paper, and plastic materials that, because of their water-solubility, can be readily removed as in scouring a woven fabric after weaving, or can be converted to a permanent water-insoluble, organic-solvent-resistant and heat-resistant coating, finish or the like or any of the substrates mentioned by a baking operation at a temperature between 240° F. and 350° F. for a half to thirty-minute period or so. For example, acrylic or methacrylic acid may be copolymerized with ½ to 20% by weight of a compound of Formula IA with or without one or more other comonomers which need not be hydrophilic, such as an ester of one of the acids, like ethyl acrylate, methyl methacrylate, and so on, and the copolymer neutralized with ammonium, sodium, potassium, or lithium hydroxide to provide a neutral or alkaline copolymer salt adapted to be used as a binder, especially for aqueous systems, such as are used for textile printing or for loom sizes, which salt after drying on the textile may be insolubilized and rendered permanent by baking at 240° to 350° F.

The following examples are illustrative of procedures that may be used to make the monomers and polymers of the invention and to make use of them, the temperatures being centigrade and the parts and percentages being by weight unless otherwise indicated.

EXAMPLE I

A solution comprising 477 g. of methyl methacrylate, 205 g. of ethyl acrylate, 17.5 g. of N-(β-methacryloxyethyl)-2-morpholinone and 0.7 g. of azodiisobutyronitrile is added in the course of one and one-half hours to a reaction flask containing 1050 g. of toluene maintained between 90 and 100° C. by means of external heating. Stirring and heating are continued for a period of eight hours with periodic additions of 0.7 part of azodiisobutyronitrile at the second, fourth and sixth hours. At approximately 40% resin solids the viscosity of the resulting solution was 8.8 poises.

Five-mil wet films of this polymer are cast on degreased steel, air-dried, and baked at 150° C. for 30 minutes. The knife adhesion of this film is good. Unpigmented films are also cast over an alkyd primer (Duraplex C–57) and baked at 150° C. for 30 minutes. Such films show excellent intercoat adhesion to the substrate. In every case comparable polymers without the morpholinone monomer are much less adhesive to both cold-rolled steel and alkyd-primed steel.

EXAMPLE II

A copolymer of 136 parts of methyl methacrylate, 204 parts of butyl methacrylate, and 10.5 parts of N-[β-(4-pentenoyloxy)ethyl]-2-morpholinone is prepared at 94–97° in toluene with azodiisobutyronitrile as catalyst. The resulting polymer solution shows a viscosity of 223 centipoises at 25° C.

Films of this clear copolymer solution are applied to a variety of substrates. On cold-rolled steel this polymer is baked at 150° C. for 30 minutes and in other instances at 120° C. for 30 minutes. In both cases the adhesion (as measured by knife adhesion) of these films to the substrate both wet and dry is superior to control polymers without the morpholinone monomer.

EXAMPLE III

A polymer is prepared following the procedure of Example II from 58.2 parts of butyl methacrylate, 38.8 parts of methyl methacrylate and 3.0 parts of N-(β-methacryloxyethyl)-2-morpholinone. This polymer, when applied as a clear film to aluminum or alkyd-primed substrates and baked at 150° for 30 minutes, shows good to excellent adhesion both wet and dry.

EXAMPLE IV

An aqueous dispersion of an emulsion copolymer is prepared as follows: The polymerization is carried out in a one-liter, three-neck flask fitted with a poly(tetrafluoroethylene) stirrer, water condenser and thermometer. A nitrogen atmosphere is maintained over the reaction.

The polymerization mixture is prepared by addition of components in the following order.

| Reaction mixture: | Quantity |
|---|---|
| Deionized water | 570 ml. |
| Diisobutylphenoxypoly(40)-ethoxyethanol | 17.1 g. of 70% solution. |
| N - (β - methacryloxyethyl)-2-morpholine | 4.0 g. |
| Ethyl acrylate | 132.0 g. |
| Methyl methacrylate | 64. 0 g. |
| Initiator: | |
| Ammonium persulfate | 0.20 g. dissolved in 10 ml. H$_2$O. |
| Sodium hydrosulfite | 0.2 g. dissolved in 10 ml. H$_2$O. |
| FeSO$_4$·7H$_2$O (0.1% solution) | 2.0 ml. |

After addition of water, dispersant and monomers the mixture is agitated to promote emulsification and the temperature is adjusted to 14° C. with an ice bath. Following this the redox initiator is added. Initiation occurs with little delay and is followed by an exotherm to 46° C.

The dispersion is "chased" by addition of 0.2 ml. of tertiary butyl hydroperoxide and 0.05 gm. of sodium hydrosulfite in 5 ml. H$_2$O in this sequence after first raising the dispersion temperature to 55° C. with a hot water bath. The temperature then rises 5° C. over a 12-minute period.

A second "chaser" is added but no further exotherm is noticed. The dispersion is then cooled to room temperature, strained through cheesecloth and bottled.

| Dispersion characteristics | |
|---|---|
| Final pH | 3.2 |
| Percent solids | 24.7 |
| Percent conversion | 95.0 |

This dispersion is filtered under the appropriate conditions and the films obtained by coating and drying at room temperature are found to have excellent adhesion to wood and glossy alkyd substrates both wet and dry. Control polymers without the morpholinone monomer are grossly inferior in this respect.

EXAMPLE V

For the mineral coating of paper, the following procedure may be followed:

(a) The aqueous emulsion copolymer dispersion of

Example IV is adjusted to a pH of about 9 with ammonium hydroxide and diluted to a solids concentration of about 24%.

(b) Eighty parts of the fine coating clay (kaolin), 20 parts of titanium dioxide, 0.2 part of sodium hexametaphosphate are mixed in 23 parts of water, and 0.2% (on the weight of clay) of sodium hydroxide is added to adjust the pH to 9. The mixture thus obtained is added to 50 parts of the aqueous dispersion obtained in part (a) hereof.

A dry chipboard (0.017 inch thick) is then coated with the composition by means of a No. 12 wire-wound rod. About 5 to 6 pounds of the coating composition (dry weight) per 1000 sq. ft. of the board is thus applied to one surface. The coated board is dried in an oven by air heated at 85° C. for a period of 45 to 60 seconds. It is then calendered by rolls at room temperature at a pressure of 50 lbs./lineal inch. The coated board has a good, smooth surface highly receptive to ink and resistant to pick by tacky inks.

EXAMPLE VI

For the enameling of electrical conductors, the following procedure may be followed:

(a) Prepare an aqueous 5% solution of the N-hydroxyalkyl glycine-type hydrolysis product of N-(acryloxyethoxyethyl)-2-morpholinone and add N-methoxymethylmethacrylamide to provide a concentration of 8% of the latter in the solution. Heat a solution of 1 part of lauryl sulphate and 0.3 part of ammonium persulphate in 135 parts of water to 45° C., and mix it, in a nitrogen atmosphere, with a solution of 0.5 part of sodium pyrosulphite $Na_2S_2O_5$ in 15 parts of water. Then simultaneously run into this heated solution over a period of 3 hours, a mixture of 65 parts of acrylonitrile, 31 parts of butyl acrylate and 0.5 part of dodecylmercaptan, as well as 50 parts of the previously prepared solution of the methacrylamide and of the hydrolyzed morpholinone maintaining a temperature of 45–50° C. during the polymerization thereby effected. Hold another 2 hours at 45–60° C. to complete the polymerization. The latex which is formed may then be freed from any residues of unreacted monomers in vacuo and with stirring.

(b) Add 8 parts of dimethyl formamide to the latex thus prepared and guide one or more copper wires several times, 3 to 6 times, through a bath of the latex. Heat the coated wire after each passage through the bath by passing it through a drying tube at a temperature of 280° C. with a speed of 6–10 m./min.

EXAMPLE VII

A mixture of 300 g. methyl methacrylate, 177 g. vinyltoluene, 200 g. of 2-ethylhexyl methacrylate, and 23 g. of N - [3-(crotonoxy)propyl]-5-methyl-2-morpholinone and 0.8 g. of azodiisobutyronitrile may be added in the course of one and one-half hours to a reaction flask containing 1050 g. of xylene maintained between 90 and 100° C. by means of external heating, stirring and heating being continued for a period of eight hours with periodic additions of 0.7 part of azodiisobutyronitrile at the second, fourth and sixth hours.

Five-mil wet films of this polymer may be cast on degreased steel, air-dried, and baked at 150° C. for 30 minutes to form adherent protective coatings thereon.

EXAMPLE VIII

A mixture of 200 g. of vinyl acetate, 100 g. vinyl chloride, 150 g. of styrene, 230 g. butyl acrylate, and 20 g. of N - [β - (3 - pentenoyloxy)propyl] - 3,3-dimethyl - 2-morpholinone and 0.75 g. of azodiisobutyronitrile may be added in the course of one and one-half hours to a reaction flask containing 1050 g. of xylene maintained between 90 and 100° C. by means of external heating, stirring and heating being continued for a period of eight hours with periodic additions of 0.7 part of azodiisobutyronitrile at the second, fourth and sixth hours.

Five-mil wet films of this polymer may be cast on degreased steel, air-dried, and baked at 150° C. for 30 minutes to provide adherent protective coatings thereon.

EXAMPLE IX

For the bonding of non-woven fabrics, the following procedure may be follower:

(a) An aqueous dispersion of an emulsion copolymer may be prepared by the procedure of Example IV using the following monomers in the proportions stated:

| | Grams |
|---|---|
| N - (5 - hexenoyloxyethoxyethoxyethoxyethyl) - 2 morpholinone | 2 |
| Ethyl acrylate | 10 |
| Acrylamide | 80 |
| N-methylolacrylamide | 5 |
| | 5 |

(b) Pad a non-woven fabric formed of several plies of carded viscose rayon fibers with alternate layers cross-laid with respect to each other so that the assemblage has a weight of 2.5 ounces per sq. yard through the acidic polymer dispersion thus obtained to provide about 200% wet pickup. Dry in ambient air a few minutes and then heat the impregnated web at about 150° C. for about 5 minutes to produce a fabric which is well bonded and resistant to laundering as well as drycleaning.

EXAMPLE X

Aqueous solutions of homopolymers of each of the monomeric hydrolysis products obtained in Example IX (b) and (c) of Serial No. 368,737 supra may be prepared by heating 10% aqueous solutions of the respective hydrolysis products to 50° C. with 2 p.p.m. of ammonium persulfate added to the solutions. Yarns of cotton, rayon, wool, nylon and cellulose acetate may be sized by passing them through aqueous solutions of the polymers obtained as just described after diluting the solutions to 3% concentration and partially neutralizing them with sodium hydroxide, the neutralization being insufficient to cause the viscosity of the neutralized solutions to exceed 35 centipoises at room temperature. The sizes may be readily removed on scouring the fabrics obtained in normal fashion.

EXAMPLE XI

A mixture of 10 grams of N-(β-methacryloxyethyl)-3,3-pentamethylene-2-morpholinone, 15 grams of vinyltoluene, 55 grams of vinylidene chloride and 20 grams of ethyl acrylate may be formed into a copolymer by the procedure of Example III. The latex may be used to form water-based paints for the protective coating of wood, alkyd-primed metals, and alkyd-primed wood panels.

I claim:

1. As a composition of matter, an addition polymer of a compound selected from the group consisting of those having the following Formula I, those having the following Formula IA, and mixtures thereof

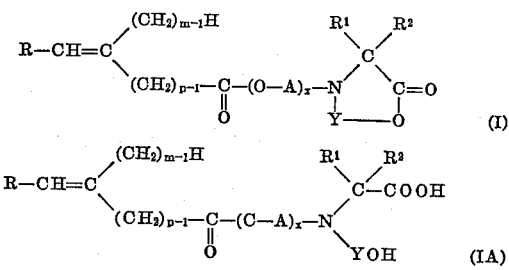

wherein

R is selected from the group consisting of H and methyl,
$m$ is an integer having a value of 1 to 3,
$p$ is an integer having a value of 1 to 4,
$x$ is an integrer having a value of 1 to 4,
A is an alkylene group having 2 to 4 carbon atoms,
$R^1$ and $R^2$ are selected from the group consisting of (1)

a composite group which forms a cyclic ($C_5$ to $C_7$)-hydrocarbon group with the adjoined C atom and (2) separate groups in which $R^1$ is selected from the group consisting of H, ($C_1$–$C_8$)-alkyl, and phenyl, and $R^2$ is selected from the group consisting of H and ($C_1$–$C_8$)-alkyl, and Y is an alkylene group having 2 to 4 carbon atoms, A having at least two carbon atoms extending in a chain between the adjoined O and N atoms and Y having 2 carbon atoms extending in a chain between the adjoined O and N atoms, with the provisos that when $p$ is greater than 1, $m$ is 1 and when $m$ is greater than 1, R is H.

2. A composition according to claim 1 in which the polymer is a copolymer of a compound of Formula I and of a compound of Formula IA.

3. A composition according to claim 1 in which the polymer is a copolymer of about ½ to 30% by weight of at least one compound of the formulas with at least one other copolymerizable ethylenically unsaturated compound.

4. A composition according to claim 1 in which the polymer is a copolymer of about ½ to 30% by weight of at least one compound of Formula IA with at least one other copolymerizable monoethylenically unsaturated compound.

5. A composition according to claim 4 in which the other copolymerizable compound comprises vinyl acetate, vinyl chloride, vinylidene chloride, styrene, vinyltoluene, or an amide, nitrile, or ester of acrylic or methacrylic acid.

6. A composition according to claim 4 in which the copolymer comprises polymerized units of ethyl acrylate and methyl methacrylate.

7. A composition according to claim 1 in which the polymer is a copolymer of about ½ to 30% by weight of at least one compound of Formula I with at least one other copolymerizable monoethylenically unsaturated compound.

8. A composition according to claim 7 in which the other copolymerizable compound comprises vinyl acetate, vinyl chloride, vinylidene chloride, styrene, vinyltoluene, or an amide, nitrile, or ester of acrylic or methacrylic acid.

9. A composition according to claim 7 in which the copolymer comprises polymerized units of ethyl acrylate and methyl methacrylate.

10. A composition according to claim 3 in which the copolymer comprises up to 2% by weight of acrylic or methacrylic acid.

No references cited.

JOSEPH L. SCHOFER, *Primary Examiner.*

S. M. LEVIN, *Assistant Examiner.*

UNITED STATES PATENT OFFICE
CERTIFICATE OF CORRECTION

Patent No. 3,342,786                                 September 19, 1967

William D. Emmons

It is hereby certified that error appears in the above numbered patent requiring correction and that the said Letters Patent should read as corrected below.

Column 10, formula (IA), for that portion of the formula reading $-(C-A)_x-$                    read                   $-(O-A)_x-$ Signed and sealed this 22nd day of April 1969.

(SEAL)
Attest:

Edward M. Fletcher, Jr.                            EDWARD J. BRENNER
Attesting Officer                                              Commissioner of Patents